Jan. 16, 1968  C. J. HOLTKAMP  3,364,338
OVEN TEMPERATURE CONTROL
Filed Jan. 15, 1965
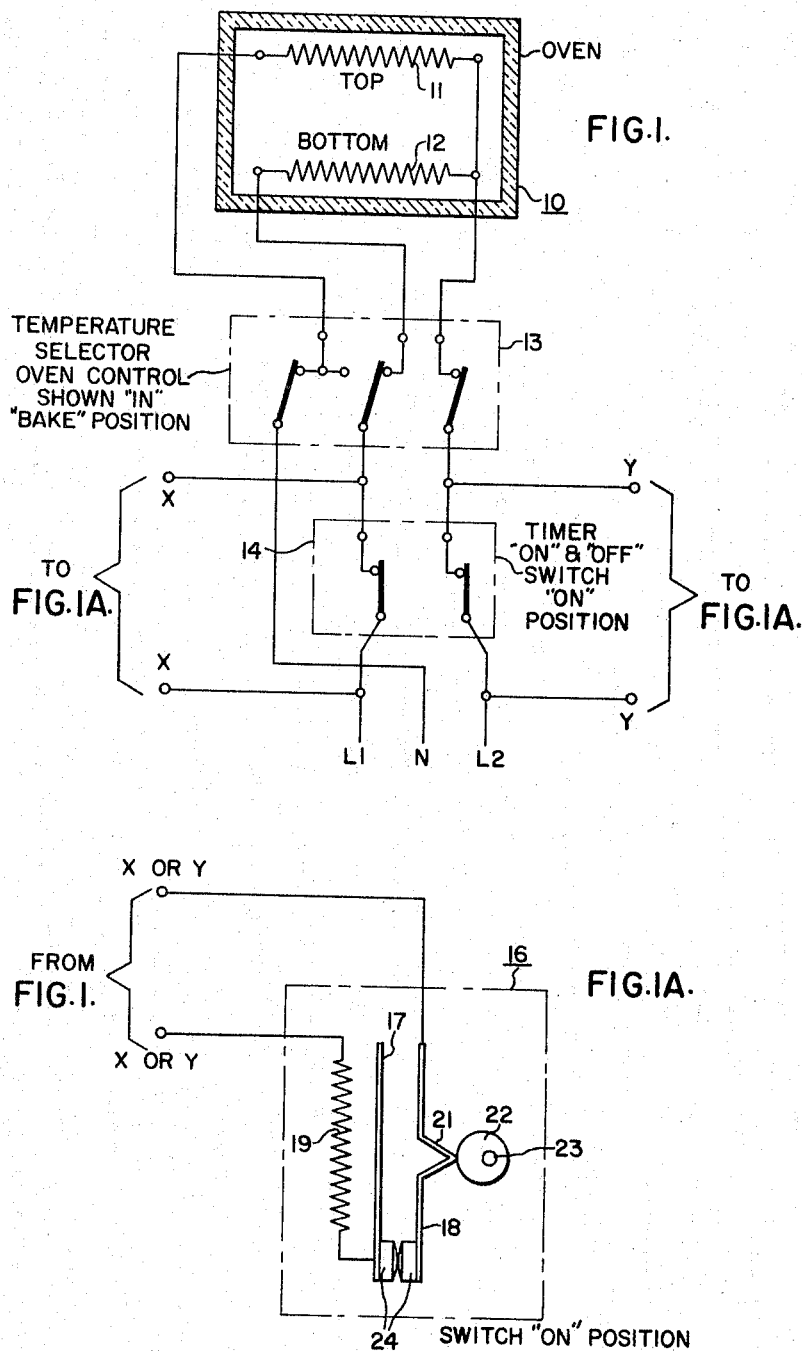
WITNESSES
Theodore F. Wrobel
SBSklar, Jr.
INVENTOR
Calvin J. Holtkamp
BY
ATTORNEY United States Patent Office 3,364,338
Patented Jan. 16, 1968

3,364,338
OVEN TEMPERATURE CONTROL
Calvin J. Holtkamp, Mansfield, Ohio, assignor to Westinghouse Electric Corporation, East Pittsburgh, Pa., a corporation of Pennsylvania
Filed Jan. 15, 1965, Ser. No. 425,729
4 Claims. (Cl. 219—398)

ABSTRACT OF THE DISCLOSURE

An oven temperature control including a temperature selector for controlling periodic energization of the heating elements and a timing device for automatically starting and stopping a cooking cycle and further including a keep-warm circuit for maintaining the ambient temperature of the oven at a predetermined value after the cooking cycle has been stopped. The control is distinctive in that the temperature at which the oven is kept warm may be varied by the user.

This invention relates, in general, to apparatus for controlling the temperature of an oven and, more particularly, to means for producing a holding temperature, that is, a temperature less than that used for cooking, but high enough to keep the contents of an oven warm.

There has always been a need for retention of heat in food when the cooking operation has been completed. This is usually accomplished by maintaining the environment in the oven between 150–225° F., i.e. temperatures which are not high enough to continue cooking the food. The obvious advantage of continued low heat after cooking is to enable the cook to plan for a suitable serving time, which may be several hours after cooking has terminated. A common expedient used in prior art devices, of the type herein contemplated is that of a bypass circuit shunted across the timer contacts of the oven. Some bypass circuits comprise a cycling switch, normally calibrated or adjusted by the manufacturer, and cannot, therefore, be adjusted by the operator to suit his individual needs or desires.

Accordingly, it is the general object of this invention to provide a new and improved temperature control for an oven.

It is a more particular object of this invention to provide a new and improved oven control having temperature holding means, the setting of which may be varied by the user.

Another object of this invention is to provide a new and improved oven control having switch means adapted to activate the temperature holding circuit as well as vary the range of temperatures at which the temperature holding circuit will function to maintain food temperatures after cooking has been terminated.

Briefly, the present invention accomplishes the above cited objects by providing an oven control having a bypass circuit comprising a cycling switch which may be connected in shunt with the timer contacts. This type of connection eliminates the necessity for a special, more expensive, timer with back contacts and permits addition of the bypass control to any range having a standard timer. Moreover, this type of connection provides a safety feature not found in most prior art devices. This is because the oven heaters are under the cooking temperature limit control of the oven thermostat in the event that the cycling switch of the bypass circuit should fail closed. The cycling switch comprises a bimetallic element actuated by an external resistance heater. It will be understood, however, that the bimetallic element may be supplied with current in which case its internal resistance would cause it to be self-heating. A control knob which is external to the range may be provided for actuating the cycling switch and adjusting the setting thereof in accordance with correlated indicia contiguous with the periphery of the control knob.

Further objects and advantages of the invention will become apparent as the following description proceeds and features of novelty which characterize the invention will be pointed out in particularity in the claims annexed to and forming a part of this specification.

For a better understanding of the invention, reference may be had to the accompanying drawings, in which:

FIGURE 1 is a schematic circuit diagram, entirely conventional except for wiring XX and YY, to which a circuit shown in FIG. 1A may be connected to provide the novel features of the present invention; and FIG. 1A is a schematic diagram of a circuit which may be connected into a conventional oven control to provide a means for maintaining the oven at a given degree of warmth after the set cooking operation has been terminated.

Referring now to the drawings, especially FIG. 1, reference character 10 designates generally an oven shown schematically as an insulated box. The oven is provided with a conventional top heating element 11 and bottom heating element 12. When the temperature selector represented schematically by the box 13 has been set to the bake position, and the on and off switch of the timer, represented schematically by the box 14, has been set to the "on" position, the power supply will be seen to be connected to the heating elements, so that the bottom element will be connected between L2 and L1 and the top heating element will be connected between L2 and N (neutral). In accordance with conventional arrangements, an oven thermostat is provided to interrupt the circuits when the temperature in the oven exceeds the figure set on the temperature selector, but since this thermostat does not form a part of this invention, it is not shown herein.

When the bypass circuit of FIG. 1A is connected to the terminals XX, the bottom heating element 12 will be connected in series with the top heating element 11 between the power terminals L1 and N when the timer contacts are open. When this bypass circuit is connected to the terminals YY, the top heating element alone will be connected between the power terminals L2 and N when the timer contacts are open. As can be seen from FIG. 1, the bypass circuit in both instances is connected in shunt with the timer contacts, the purpose being the elimination of the necessity for a special, more expensive, timer with back contacts. It will be understood, of course, that the bypass circuit could be used with a timer having back contacts. It can further be seen from FIG. 1 that by connecting the output side of the bypass circuit to the input side of the temperature selector instead of directly to the oven heater, as in many prior art devices, a safety feature is provided because the oven heating elements are under the cooking temperature limit control of the oven thermostat in the event that the cycling switch, schematically represented by box 16, should fail closed.

The bypass circuit of FIG. 1A is what may be termed a temperature holding means and it operates to maintain the temperature of the oven at a predetermined lower temperature dial setting as selected by the user to keep the contents of the oven warm indefinitely after the cooking operation has terminated.

As noted hereinabove, the heating elements 11 and 12 may be connected in series through the bypass circuit. The use of both elements, beside providing balanced heat during the holding period, enables the cycling switch 16 to be set to operate at a higher percentage of power, i.e. at a value where calibration is less critical.

For example, the wattage of the top heater if used alone would be approximately 800 watts on 118 volts, which must be cycled down to approximately 160 watts (i.e. power required at one specific holding temperature which may be set by the operator) by a 20% input setting on the cycling switch. Contrariwise, the wattage available when the bypass circuit is connected to XX terminals (i.e. both heating elements operative) is approximately 400 watts on 118 volts, almost equally divided between the two heating elements. This 400 watts can be cycled down to approximately 160 watts (i.e. power required at one specific holding temperature which may be set by the operator) by a 40% input setting on the cycling switch.

By means of the conventional timer 14 the oven may be turned "on" and the contents subjected to the desired temperature of, say 400° F. for, say, three hours, after which the oven will be automatically turned "off." Thereafter, the oven will cool to a somewhat lower temperature than the 400° F., whereat the cycling switch 16 of FIG. 1A will come into operation to maintain the oven at the lower or holding temperature which may be, for example, in the range from 150–225° F.

The cycling switch 16 comprises a pair of contact arms 17 and 18. The contact arm 17 may be of the temperature responsive bimetallic type which is provided with its own source of external heat through a resistance heating element 19. The contact arm 18 is provided with a cam following surface 21 which may be manually displaced by means of a manually operable cam 22. The cam which is adapted to turn with a shaft 23, actuated by a control knob (not shown), is effective to vary the point (corresponding to a specific temperature) at which the contact arms will cause "making" and "breaking" of a pair of contacts 24, depending upon the point of contact of the cam follower 21 on the surface of the cam 22.

While it has been shown and described what is at present considered to be the preferred embodiments of the invention, modifications thereto will readily occur to those skilled in the art. It is not desired, therefore, that the invention be limited to the specific arrangements shown and described and it is intended to cover in the appended claims all such modifications as fall within the true spirit and scope of the invention.

What is claimed is:
1. In a range having an oven with upper and lower heating elements, a temperature selector for controlling periodic energization of the heating elements and a timing device for automatically starting and stopping a cooking cycle; the improvement comprising: a keep-warm circuit connected in shunt with said timing device; said circuit comprising switch means including a temperature responsive member for opening and closing said circuit when the ambient temperature in said oven becomes a predetermined value less than the cooking temperature as established by said temperature selector and means operatively associated with said switch for selectively varying the temperature at which said circuit is opened and closed by said temperature responsive means.

2. Structure as specified in claim 1, wherein said circuit is connected across said timing device in such a manner as to effect simultaneous energization of the heating elements thereby the accuracy of calibrating said temperature responsive means is maximized.

3. Structure as specified in claim 1, wherein said temperature responsive means comprises a cycling switch having a pair of contact arms one of which is a bimetallic element capable of deflecting from a normally closed position to a circuit opening position and an external heating element operatively associated with said bimetallic element.

4. Structure as specified in claim 3, wherein said adjusting means comprises a cam adapted to cooperate with the other of said contact arms to thereby effect an increase or decrease in the change of temperature required for the bimetallic element to deflect to the open or closed position.

References Cited

UNITED STATES PATENTS

| | | | |
|---|---|---|---|
| 2,630,515 | 3/1953 | McCormick et al. | 219—491 |
| 2,926,233 | 2/1960 | Holtkamp | 219—492 |
| 2,993,974 | 7/1961 | Stobel | 219—492 X |
| 2,993,975 | 7/1961 | Beal | 219—494 X |
| 3,032,636 | 5/1962 | Schaver | 219—398 |
| 3,125,659 | 3/1964 | Welch. | |

RICHARD M. WOOD, *Primary Examiner.*

C. L. ALBRITTON, *Assistant Examiner.*